Nov. 16, 1926.

P. YOST 1,606,779

DIRECTION SIGNAL FOR VEHICLES

Filed Oct. 9, 1925     2 Sheets-Sheet 1

Inventor
Peter Yost
By his Attorneys
Merchant and Kilgore

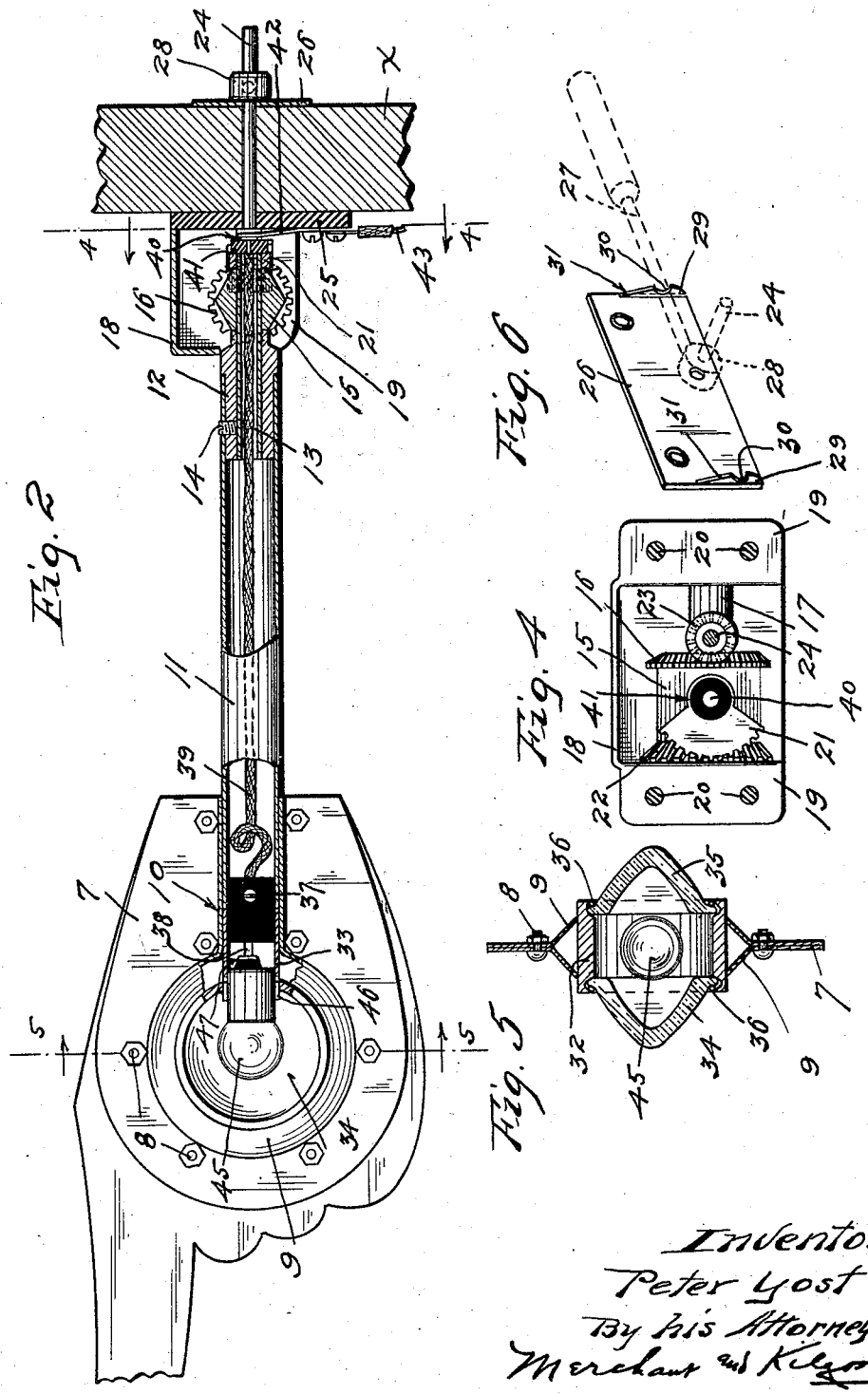

Patented Nov. 16, 1926.

1,606,779

UNITED STATES PATENT OFFICE.

PETER YOST, OF MINNEAPOLIS, MINNESOTA.

DIRECTION SIGNAL FOR VEHICLES.

Application filed October 9, 1925. Serial No. 61,526.

My present invention relates to a direction signal for vehicles and has for its object to improve the same in the several particulars hereinafter noted.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the direction signal shown in an inoperative position by means of full lines and in an operative position by means of broken lines, and also showing by means of broken lines a fragmentary portion of a closed automobile body to which said signal is attached;

Fig. 2 is a fragmentary view partly in rear elevation and partly in longitudinal central section showing the direction signal in an operative position;

Fig. 3 is a detail view principally in vertical section taken on the line 3—3 of Fig. 1 on an enlarged scale;

Fig. 4 is a detail view principally in elevation with some parts sectioned on the line 4—4 of Fig. 2;

Fig. 5 is a detail view in transverse section taken on the line 5—5 of Fig. 2; and Fig. 6 is a perspective view of the combined inside bearing and lock plate and also shows, by means of broken lines, the operating lever for the direction signal.

The direction signal includes a head which, as shown, is in the form of a hand 7 comprising two flat sheets of metal, preferably aluminum, detachably secured the one upon the other by a plurality of nut-equipped bolts 8, and, as shown, only one of these sheets has fingers formed therewith. This hand 7 has transverse co-operating half hubs 9 formed by cutting a relatively large hole in both sections of said hand and pressing the surrounding metal obliquely outward in opposite directions.

Said hand 7 also has co-operating half sleeves 10 which extend radially from the half hubs 9 away from the fingers of the hand 7 and are formed by pressing the two sections of said hand outward.

The hand 7 is secured to the outer end of a tubular arm 11, which also affords a wire conduit, by applying said half sleeves 10 around said arm and frictionally clamping the same thereon by the bolts 8. A bushing 12 is mounted in the inner end of the arm 11 and has mounted therein a hollow shaft 13, which, together with said bushing, is fixedly secured to said arm by a single set screw 14. The projecting end of the hollow shaft 13 is journalled in a transverse seat formed in the hexagon hub 15 of a segmental bevel gear 16, the axis of which intersects the axis of said shaft at right angles. A pair of axially aligned trunnions 17 on the hub 15 and gear 16 is journaled in the ends of an attaching member which, as shown, is in the form of a housing 18, and which ends have outstanding flanges 19 secured by screws and bolts 20 to the outer face of a closed metal automobile body X, for attaching the direction signal thereto. While the direction signal is shown as secured to a closed automobile body, it may be readily attached to the cab of a truck or to a touring car.

A segmental bevel pinion 21 is rigidly secured to the hollow shaft 13 outward of the hub 15, and which pinion and the bushing 12 securely hold the tubular shaft 13 against axial movement in said hub but with freedom for rotation therein. The segmental pinion 21 meshes with a bevel gear 22 rigidly secured to the inner face of one of the ends of the housing 18. A pinion 23 meshes with the bevel gear 16 and is secured on the outer end of a shaft 24 journaled in an insulating plate 25, interposed between the housing 18 and body X and secured by the screws 20, and in a metal plate 26 secured by screws to the inner face of said body.

On the inner end of the shaft 24 is a hand lever 27 by which said shaft may be oscillated. The lever 27 is provided with a head 28 through which the shaft 24 projects and which lever has screw-threaded engagement with said head and impinges against the shaft 24 to hold said head in different axial and rotated adjustments on said shaft. To hold the hand lever 27 in either of its two extreme positions there are formed on the ends of the plate 26, lugs 29 having lock seats 30 and cam surfaces 31 with which the lever 27 engages to direct the same into either of the seats 30.

A cylindrical lamp casing 32 is mounted in the half hubs 9 and has secured thereto a radially projecting standard lamp socket 33 telescoped into the half sleeves 10 forward of the arm 11 and frictionally secured therein at the time the sections of the hand 7 are clamped onto the arm 11. This lamp socket 33 securely holds the lamp casing 32 against axial movement in the half hubs 9. A white lens 34 is mounted in the front end of the lamp casing 32, and a red lens 35 is mounted in the rear end thereof, and which lenses are detachably secured in said casing by slit clamping rings 36.

A standard insulating block 37 is telescoped into the outer end of the arm 11 and the inner end of the lamp socket 33, and its yielding contact point 38 is connected to one end of a wire 39 in the tubular arm 11. The other end of this wire 39 is secured to a fixed contact point 40 in an insulating collar 41 attached to the hollow shaft 13 at the axis thereof outward of the segmental pinion 21. Co-operating with the fixed contact 40 is a spring contact finger 42 secured to the insulating block 25. One end of a wire 43 is attached to the spring contact finger 42 and leads from a battery or other source of electrical energy. The lamp socket 33 is grounded to the frame of the automobile through the arm 11, housing 18, and screws and bolts 20. An electric light bulb 45 is secured in the lamp socket 33 by the customary bayonet joints 46 and is located within the lamp casing 32, and its fixed contact 47 is in engagement with the yielding contact point 38.

Normally, the direction signal is in a depending position close to the outer face of the automobile body X, as indicated by full lines in Fig. 1. At this time, the fixed contact 40 is out of engagement with the spring contact finger 42, thus breaking the circuit to the bulb 45. By moving the hand lever 27 180°, the pinion 23 will rotate the gear 16 and thereby swing the direction signal from a depending position, as indicated by full lines in Fig. 1, to a horizontal position in which it projects laterally from the side of the body X, as indicated by broken lines in Fig. 1. During the upward swinging movement of the direction signal, the segmental pinion 21 moves over the fixed gear 22 and thereby imparts a one-quarter rotation to the arm 11 which turns the hand 7 from a position in which it is parallel to the side of the body X to a position in which it projects at right angles to said body. As the direction signal is moved from an inoperative to an operative position, the contact point 40 is caused to engage the spring contact finger 25 and thereby light the lamp 45 and keep the same lighted while the direction signal is in an operative position. The hand lever 27 by its engagement with the lock notches 30 firmly holds the direction signal in either of its extreme positions.

While the indicator is shown in the form of a hand, it may take various different forms such as an arrow or the like.

What I claim is:

1. A direction signal having an arm and means for operating the same, a head on said arm comprising a pair of connected side members having axially aligned hubs, and a cylindrical lamp casing telescoped through said hubs.

2. The structure defined in claim 1 in which the arm and lamp casing have interlocking engagement for holding the lamp casing in the hubs.

3. A direction signal having a tubular arm with a lamp socket seat in its outer end portion, means for operating the arm, a head on the outer end of the arm comprising a pair of separably connected side members having axially aligned hubs, co-operating half sleeves extending into said hubs and applied around the outer end portion of the arm for securing the head thereto, and a lamp casing mounted in said hubs and having an aperture into which the outer end of said arm extends for holding the lamp casing in the hubs.

4. A direction signal having a tubular arm with a lamp socket seat in the outer end portion thereof, means for operating the arm, a head on the outer end of the arm comprising a pair of connected side members having axially aligned outwardly extended truncated hubs, and co-operating half sleeves extending into said hubs and applied around the outer end portion of the arm for securing the head thereto, and a cylindrical lamp casing extending axially through said hubs and seated in the contracted ends thereof, said casing having an aperture into which the outer end of the arm extends for holding the lamp casing in the hubs.

In testimony whereof I affix my signature.

PETER YOST.